E. GRUENFELDT.
PROCESS OF MAKING CONTROLLERS, CONTROLLERS, AND PARTS THEREOF.
APPLICATION FILED JAN. 8, 1910.
1,119,012.
Patented Dec. 1, 1914.
3 SHEETS—SHEET 1.
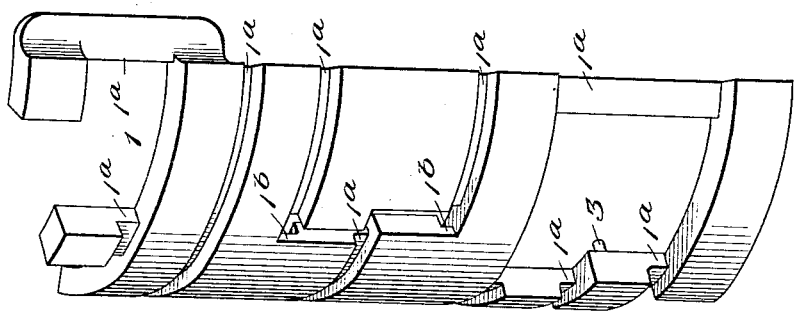
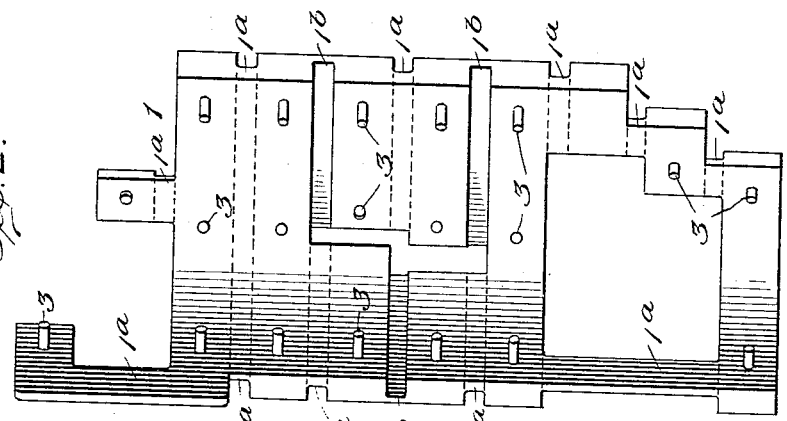
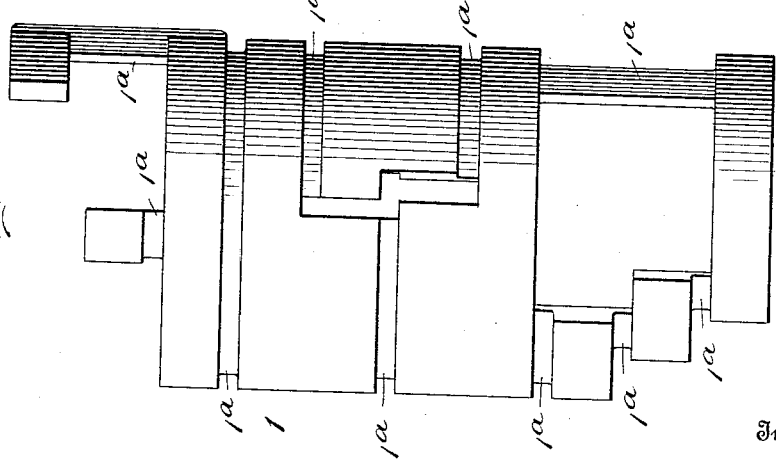

E. GRUENFELDT.
PROCESS OF MAKING CONTROLLERS, CONTROLLERS, AND PARTS THEREOF.
APPLICATION FILED JAN. 8, 1910.
1,119,012.
Patented Dec. 1, 1914.
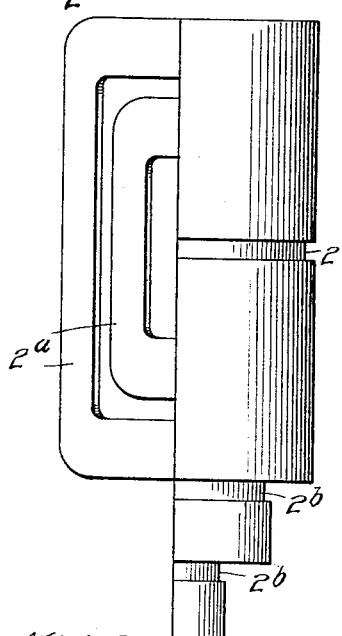
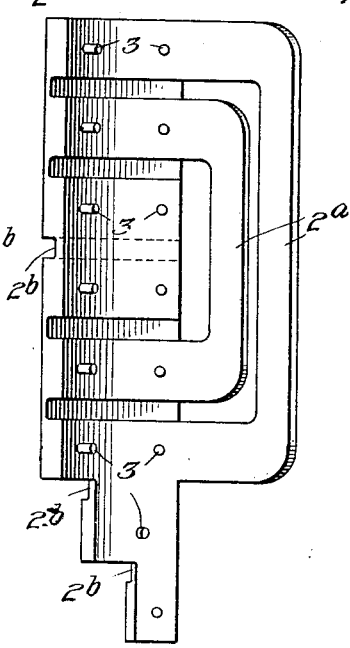
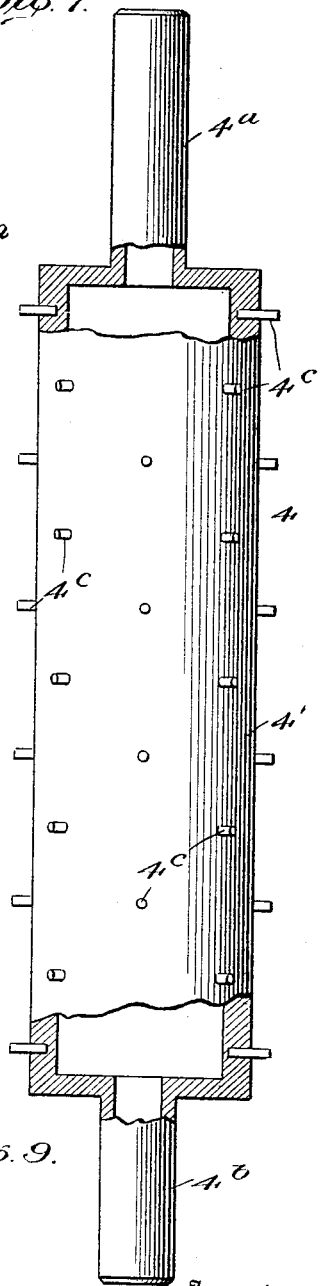
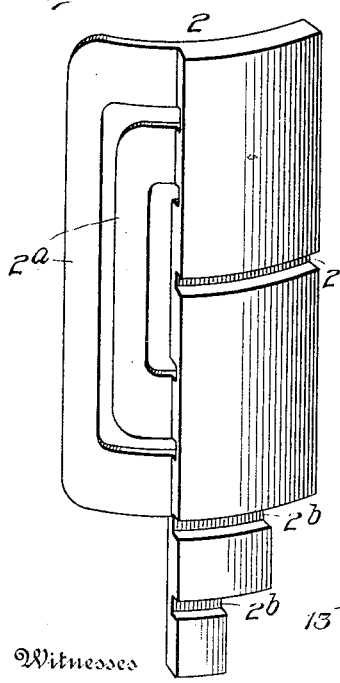
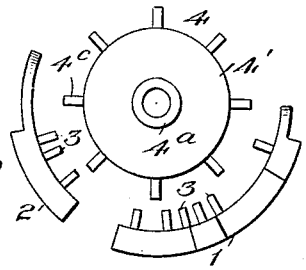
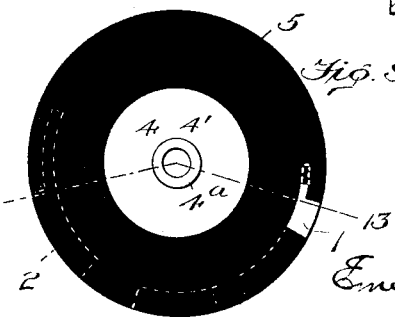

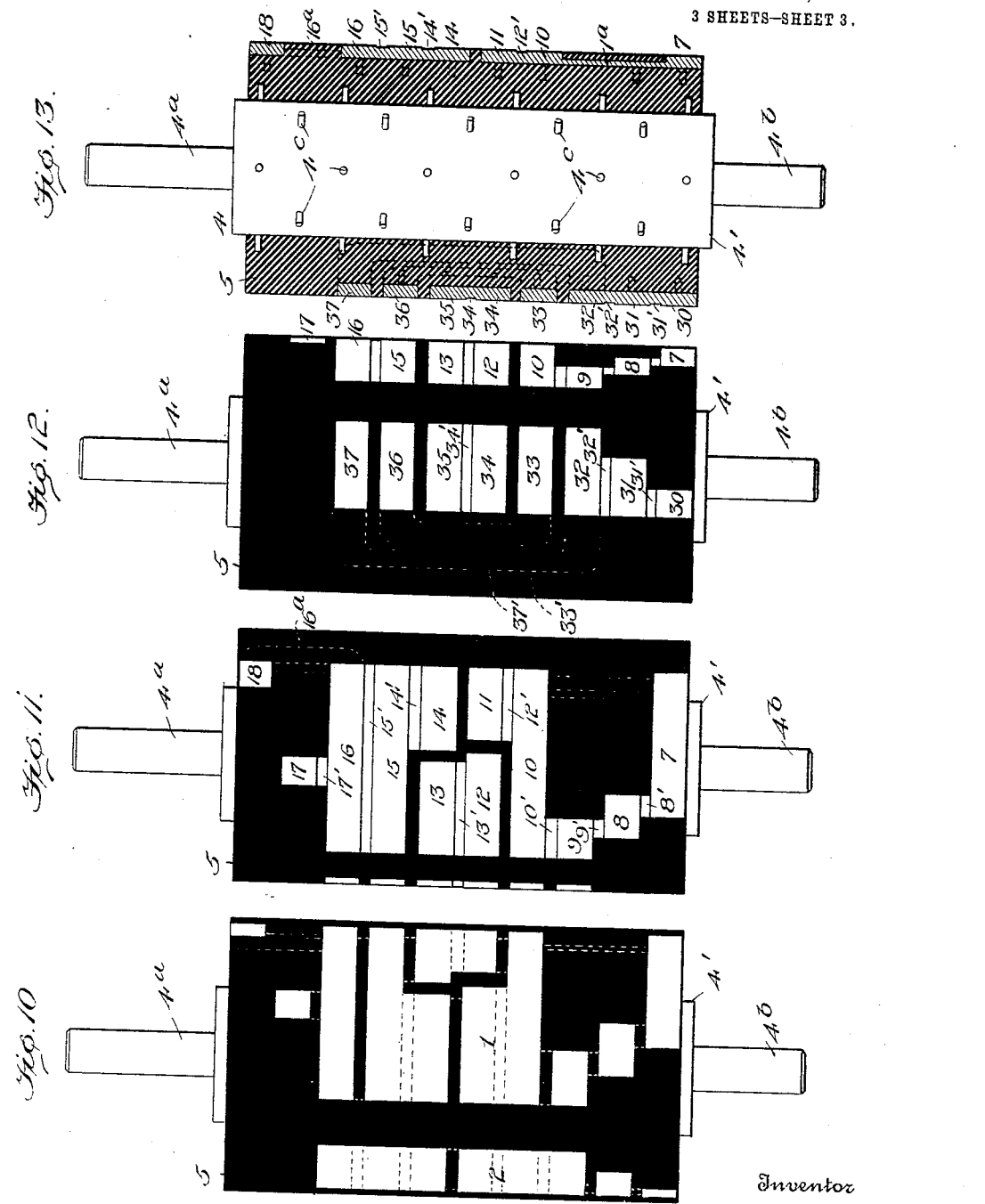

UNITED STATES PATENT OFFICE.

EMIL GRUENFELDT, OF CLEVELAND, OHIO.

PROCESS OF MAKING CONTROLLERS, CONTROLLERS, AND PARTS THEREOF.

1,119,012.  Specification of Letters Patent.  Patented Dec. 1, 1914.

Application filed January 8, 1910. Serial No. 537,083.

*To all whom it may concern:*

Be it known that I, EMIL GRUENFELDT, a subject of the Emperor of Germany, residing at Cleveland, in the county of Cuyahoga and State of Ohio, have invented certain new and useful Improvements in and Relating to Processes of Making Controllers, Controllers, and Parts Thereof, of which the following is a specification.

This invention relates to improvements in the art of making controllers, more particularly controller mechanism for electric motors, and also the controllers themselves and parts thereof.

The principal objects of my invention are to simplify and cheapen the cost of construction of such controllers, insure greater accuracy, efficiency, uniformity and durability of construction, and greatly economize in the time and labor necessitated in and by their construction.

For the purpose simply of illustration I have in the accompanying drawings shown certain steps in the process of making one of the many types of controllers to which my invention is adapted.

Figure 1 is a top plan view of an integral mass, shaped and formed to comprise when in finished condition a plurality of suitably spaced and shaped contact segments for effecting in a given motor circuit forward speed control of the motor. Fig. 2 is a bottom plan view of the same. Fig. 3 is a perspective view of the same. Fig. 4 is a top plan view of an integral mass, shaped and formed to comprise when in finished condition a plurality of suitably spaced and shaped contact segments for effecting in said given motor circuit reverse speed control of the motor. Fig. 5 is a bottom plan view of the same. Fig. 6 is a perspective view of the same. Fig. 7 is a view, partly in side elevation and partly in section, of a suitable support for the contact segments *en bloc* shown in Figs. 1 to 6. Fig. 8 is an end view illustrating the spacing or positioning of the contact segments *en bloc* for forward and reverse control relative to the support illustrated in Fig. 7. Fig. 9 is an end view illustrating in addition to the parts shown in Fig. 8, the insulating material which has been molded between and serves to hold said parts properly spaced and positioned relatively to each other. Fig. 10 is a side elevation of the parts shown in Fig. 9. Fig. 11 is a side elevation of the finished controller drum looking at the forward control contact segments. Fig. 12 is a side elevation of the finished controller drum looking at the reverse control contact segments. Fig. 13 is a section on the line 13—13, Fig. 9.

In the drawings 1 indicates as an entirety a set or series of contact segments formed *en bloc*. This may be done in any suitable manner, as by casting, stamping, or forging, so as to give an integral mass. In the embodiment illustrated in the drawings, this part 1 is formed in the arc of a circle, as the contact segments in their final position are to lie in and operate in the arc of a circle.

$1^a$ indicates the connectors which in the completed controller are to connect certain of the contact segments together beneath their brush engaging surfaces. These, as it will be seen, are consequently formed beneath the upper surface of the segments when *en bloc*. The contact segments which are to be disconnected from each other in their final form are, when the segments are *en bloc*, connected by webs or separating or spacing portions $1^b$, which need only be of a thickness sufficient to hold the segments *en bloc*, or in other words together during certain operations in the formation of a controller. The part 1, as illustrated, is formed or shaped to produce, when finished, a series of contact segments for forward operation of a motor as will be hereinafter described.

2 indicates as an entirety a set or series of contact segments also formed *en bloc* in any suitable manner and adapted when in finished condition to serve for operating the motor in the reverse direction, as will be below described.

$2^a$ are the connectors between certain of the contact segments of part 2 and near the bottom thereof.

$2^b$ are webs or spacing bars along the outer surface of the part 2 and which connect *en bloc* the contact segments which are, in the final form of the controller, to be separated from each other.

In the embodiment of my invention illustrated in the drawings each of the segment *en bloc* parts 1 and 2, preferably is provided with inwardly projecting integral lugs or tangs 3 for a purpose to be hereinafter described. Further, for the purpose of illustration, I have in the drawings shown as the insulating or insulated support on which the segments *en bloc* are mounted, a hollow casting 4, having an enlarged central portion 4' and reduced end portions 4ª, 4ᵇ. The enlarged portions 4' may be provided with outwardly extending lugs or tangs 4ᶜ for a purpose to be later described.

5 is insulating material of any suitable character, surrounding the cylinder 4' and interposed between it and the segments *en bloc* 1 and 2, and forming with the cylinder an insulating or insulated support for the contact segments. This insulating material surrounds the tangs or projections 3 and 4ᶜ, and enters between the contact segments which are connected at their upper unfinished surfaces by the webs 1ᵇ or 2ᵇ, and serves not only the purpose of insulating the contact segments from the center part 4, but also to bind, hold, connect or fasten the said center parts and contact segments firmly together.

In practice, in carrying out my invention in the art or process of making controllers, parts, such as those illustrated in the drawings by 1 and 2, are designed and formed in any suitable manner to yield or give under final treatment the desired number of properly shaped and spaced contact segments. Each of said parts is then positioned relatively to and connected to a suitable insulating support, or a suitable insulating material is molded between said segments *en bloc* and a support, or a suitable insulating connection is formed for supporting and holding the segments *en bloc*, so that after their finished treatment the resulting contact segments will be disposed as desired relative to their support. Then the segments *en bloc* are surfaced or dressed down until the webs or spacing parts which connect the ultimately to be separated contact segments are removed, and the contact segments which they connect are exposed, separated from each other, whereupon this part of the controller mechanism is completed and ready for operation in connection with any suitable brushes or equivalent contact devices.

As illustrating one simple method of carrying out my process, I will describe it in connection with the producing of what is ordinarily termed a drum type of controller, such as the one illustrated in Figs. 10 to 13 inclusive. First may be designed and formed the part 1 or contacts *en bloc* for the forward speed control contact segments. The supporting or carrying means for this contact *en bloc* part may be formed in any suitable manner. The one illustrated in the drawings is as heretofore described, a hollow casting. The ends 4ª, 4ᵇ may be centered in any suitable manner. The contact *en bloc* part 1 is then positioned relative to the said support. This may be done by placing the two parts in a suitable mold or flask, or in any suitable manner supporting them, and the insulating material 5 may then be molded or cast between the parts, binding and connecting or fastening them together, so as to form what we may call, as an entirety, the controller drum. This drum may then be placed in a lathe and turned down at its circumference until the webs or spacing parts between the ultimately to be separated contact segments are all cut away, thereby separating from each other the contacts which they connected, and leaving all of the contacts properly surfaced and properly spaced relative to each other and suitably and securely positioned on and relatively to the operating shaft for the drum, which is formed by turning down the exposed ends 4ª, 4ᵇ of the center piece 4.

The segments *en bloc* part 2 for the reverse speed control contacts, may be positioned relative to the supporting piece at the same time that the part 1 is thus positioned, so that but one operation of molding the insulating material about the parts 1 and 2 is required. Whereas, in parts 1 and 2 the contact segments are *en bloc* and all connected together, in the finished form of the controller the contacts bear the following relation to each other: Referring to Fig. 11, the segment 7 is connected to the segment 8 by the integral connector 8'. The segment 8 is connected to the segment 9 by the integral connector 9'. The segment 9 is connected to the segment 10 by the integral connector 10'. The segment 10 is connected to the segment 11 by the integral connector 12'. The segment 11 is separated from the segment 12, but the latter is connected to the segment 13 by the integral connector 13'. The segment 14 is separated from the segment 13 but is connected by the integral connector 14' to the segment 15. The segment 15 is connected by the integral connector 15' to the segment 16, which in turn is connected to the segment 17 by the integral connector 17'. The integral connector 16ª connects the segment 16 to the segment 18.

For reverse control the segment 30 is connected by the integral connector 31' to the segment 31. The segment 32 is connected by the integral connector 37' to the segment 37, and by the integral connector 32' to the segment 31. The segment 33 is connected by the integral connector 33' to the segment 36 and the segments 34 and 35 are connected by the integral connector 34'.

As the controller in its finished form is simply one of the type illustrated in my application Serial No. 509,492, filed July 26, 1909, and is in extensive commercial use, it is not thought necessary to herein describe how it operates in the particular electric circuit for which it is intended and devised. So far as I am advised, the practice heretofore generally adopted in the manufacture of controllers has been to individually shape, space, and connect by connectors the contact segments, each of which connectors has one or more individual non-integral connections with one or more of the said segments. At any rate, a somewhat laborious and tedious practice has been followed of individually spacing and connecting certain of the contact segments, all of which required considerable skill and much labor in the production of an electrically efficient and accurately made device. Furthermore, the time and labor consumed in the locating, positioning, and connecting together of the various independent contact segments has been such as to make the cost of manufacture of such controllers considerable.

It was to simplify the art of constructing controllers and to materially reduce the cost thereof that I invented my herein described process, which in its simplicity and economy both of time and labor will at once be apparent. Having designed the form which a set or series of contacts *en bloc* is to assume, it will be readily seen that duplicates thereof may be quickly and cheaply constructed either by molding or casting, stamping or forging. The connection of such a contact *en bloc* to a suitable insulating or insulated support is a matter of the simplest nature. The form of the segments *en bloc* may be such that when it has been dressed down and the finished surfaces of the contact surfaces exposed, these operating surfaces of the segments will lie in a plane or the arc or arcs of a circle or circles as desired. Should it not be desired to use a moldable form of insulating material, or rather should it be desired to use a form which requires some independent means other than the material itself for connecting or attaching the contact segments thereto, such means will readily suggest themselves, as screws, rivets, nails, bolts, or their equivalents, or the well known mica or mica disk insulation may be employed.

In carrying out my invention in connection with the making of a drum type of controller, its advantages in the easy and rapid location of the contact segments relative to the axis of the drum, will be clearly understood. Furthermore, in this type of controller, having located the segments *en bloc* or in integral sets on the insulating or insulated support which is to carry them, the finishing of the entire drum may be simply and quickly accomplished by placing it in a lathe and turning it down the required amount as indicated by the thickness of the webs or spacing sections, which, when the contact segments are *en bloc*, connect the ultimately to be separated segments.

As the connectors which remain between certain of the contact segments in their finished form are integral with such segments the characteristic advantages in durability and electrical efficiency of a controller built by my process over one in which the connectors between any two or more segments have to be independently connected in some manner to each of such segments, will be at once understood.

For the purpose of description in the present instance the spacing webs $1^a$ and $2^b$ may be said to be temporary spacing webs, in the sense that they simply space the contact segments which they integrally connect until such time as the said contact segments are to be dressed down into final form, during which step the temporary spacing webs are removed. On the other hand the connectors $1^a$ and $2^a$ may be referred to as permanent integral connectors, in view of the fact that they at all times and permanently connect together the segments with which they are integral.

To those skilled in the art of making appliances of the class described, many alterations in construction and widely differing embodiments and applications of my invention will suggest themselves, without departing from the spirit and scope thereof.

My disclosures and the description therein are purely illustrative, and are not intended to be in any sense limiting.

What I claim is:—

1. The improvement in the art of making controllers which consists in forming *en bloc* a plurality of suitably shaped and spaced contact segments certain of which are to remain connected together and are joined by permanent connectors and others of which are ultimately to be separated, and are held in position by spacing webs then connecting said segments *en bloc* to a suitable support, and then dressing down the said segments *en bloc* until the webs connecting those which are to be separated are removed.

2. The improvement in the art of making controllers which consists in forming *en bloc* a plurality of suitably shaped and spaced contact segments having spacing webs integrally connecting at their then outer surfaces certain of said segments which in finished form are to be separated, and connectors integrally connecting certain of said segments which are to remain connected, then positioning said contacts *en bloc* relative to a suitable support, then molding a suitable insulating material between said segments *en bloc* and said support, and then dressing down the material of said segments *en bloc* until the aforesaid spacing webs are removed and certain previously integrally connected contacts separated from each other and their final operating surfaces exposed.

3. As a new article of manufacture, a set of suitably spaced and shaped contact segment sections formed *en bloc*, certain of which at their outer surfaces are connected by integral temporary spacing webs, the remainder being connected by integral connectors arranged beneath the inner surfaces of said spacing webs.

4. As a new article of manufacture, a plurality of contact segment sections formed *en bloc*, certain of which at their outer surfaces only are connected by integral temporary spacing webs, the remainder being connected by integral permanent connectors.

5. As a new article of manufacture, a plurality of contact segment sections having temporary spacing webs connecting certain of said sections at their outer surfaces only, and permanent connectors connecting the remainder of said sections at points beneath the inner surfaces of said spacing webs In testimony whereof I affix my signature, in the presence of two witnesses.

EMIL GRUENFELDT.

Witnesses:
I. H. TEAGLE,
E. C. GUSTAFSON.

Copies of this patent may be obtained for five cents each, by addressing the "Commissioner of Patents, Washington, D. C."